United States Patent [19]

Piguet et al.

[11] 4,302,151
[45] Nov. 24, 1981

[54] DRAFT TUBE FOR A REACTION TURBINE

[75] Inventors: Pierre Piguet, Onex; Andre Culaud, Geneva, both of Switzerland

[73] Assignee: Ateliers des Charmilles S.A., Geneva, Switzerland

[21] Appl. No.: 35,405

[22] Filed: May 2, 1979

[30] Foreign Application Priority Data

May 9, 1978 [CH] Switzerland .................. 5000/78

[51] Int. Cl.³ ............................................. F03B 11/00
[52] U.S. Cl. .................................... 415/209; 60/696; 138/116; 138/140
[58] Field of Search ............... 60/696; 415/116, 500, 415/209, 219 R, 196, 205; 138/115, 116, 117, 140, 143; 406/191, 193, 195

[56] References Cited

U.S. PATENT DOCUMENTS

| | | | |
|---|---|---|---|
| 785,176 | 3/1905 | Mommertz | 138/140 |
| 1,289,001 | 12/1918 | Robinson | 138/116 |
| 1,467,168 | 9/1923 | Kaplan | 415/209 |
| 1,930,285 | 10/1933 | Robinson | 138/116 X |
| 2,060,101 | 11/1936 | Moody | 60/696 |
| 3,047,267 | 7/1962 | Peyrin | 60/696 X |

FOREIGN PATENT DOCUMENTS

| | | | |
|---|---|---|---|
| 469934 | 1/1929 | Fed. Rep. of Germany | 415/209 |
| 606894 | 12/1934 | Fed. Rep. of Germany | 415/500 |
| 158331 | 11/1932 | Switzerland | 415/500 |

*Primary Examiner*—Leonard E. Smith
*Attorney, Agent, or Firm*—Emory L. Groff, Jr.

[57] ABSTRACT

A draft tube for a reaction turbine is formed of two gutter-shaped members of semi-circular transverse cross-section which are secured along their edges to a dividing plate. Flat guide plates are secured in the gutters to permit flattening the stream of water during its passage through the curved part of the draft tube.

6 Claims, 4 Drawing Figures

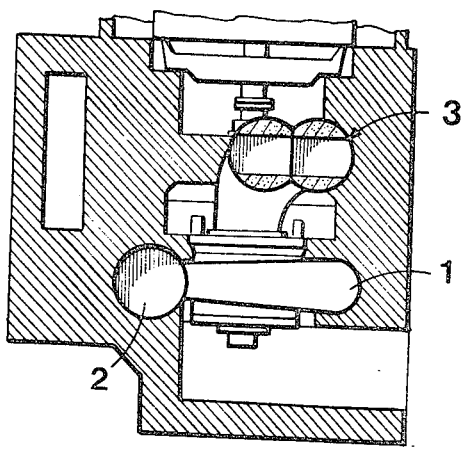
FIG. 1
FIG. 3
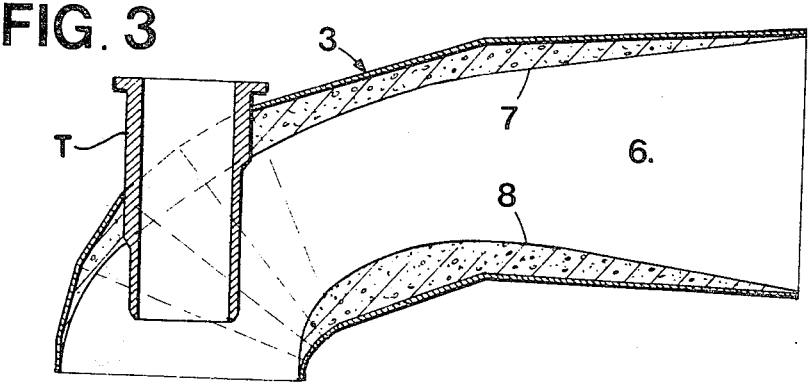
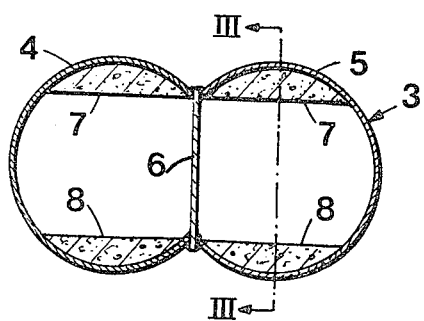
FIG. 2

DRAFT TUBE FOR A REACTION TURBINE

This invention relates to reaction turbines which are fed by water coming from a pressure conduit by means of an inlet conduit connecting the pressure conduit to a spiral tank surrounding the turbine wheel. Such turbines include a draft mounted axially of the turbine wheel for evacuation of the water. When this draft tube is curved, it is advantageous to flatten the stream of water after passage from the curved portion in order to reduce the loss of pressure which would normally result. For this purpose, the wall section is deformed transversely of the generally circular draft tube which necessitates the use of supporting means in order to assure the permanent shape of the deformed area.

The present invention has for its object the provision of a draft tube for a reaction turbine wherein it is no longer necessary to provide support means previously employed to assure resistance of the wall against hydraulic forces which are present. The draft tube of our invention is characterized in that its wall comprises gutters connected along their edges by at least one dividing plate forming a beam.

The attached drawing shows diagrammatically and by way of example a preferred form of execution of a draft tube according to the present invention.

FIG. 1 is an elevation, partly in section, of a turbine with a spiral tank including the draft tube.

FIG. 2 is a transverse section of the draft tube on a larger scale.

FIG. 3 is a longitudinal section on the line III—III of FIG. 2 on a still larger scale of the draft tube shown in FIG. 2.

Figure 4:
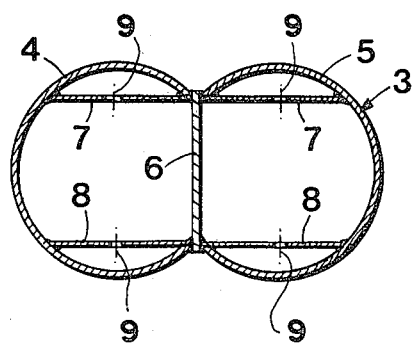
FIG. 4 is a transverse section of an another embodiment of the draft tube on a larger scale.

The turbine shown in FIG. 1 comprises a spiral tank 1 connected to a conduit under pressure (not shown) by a water inlet conduit 2. The turbine is provided at its upper portion with a curved draft tube 3 assuring evacuation of the water.

As shown in the drawing, the draft tube 3 is made of an assembly of two gutters 4,5 of semi-circular cross-section connected at their edges by a dividing plate 6 of a width less than the diameter of the gutters 4,5. Preferably the draft tube 3 is of circular shape in transverse section particularly at its ends which are connected to the turbine. At the top of the curve and a relatively short distance beyond, the draft tube 3 is preferably provided with the flat metal guide plates 7,8 for guiding the stream of water. The plates are disposed opposite one another and are soldered along one of their edges to the dividing plate 6 and at their other edges to related internal faces of the gutters 4 and 5. These metal guide plates are relatively thin and the space between them and the curved walls of the gutters 4,5 can be filled with gravel in such a manner to transfer onto said walls the pressure exerted by the stream of water on the guide plates 7,8 during its passage through the draft tube.

Thus, the guide plates 7,8 cause flattening of the stream of water during its passage through the curved part of the draft tube 3 without undergoing a force tending to deform them, the semi-circular wall sections and the dividing plate 6 of the draft tube forming a rigid assembly supporting said force. It is herefore possible by flattening of the stream of water in the curved portion of the draft tube 3, to improve the efficiency of the turbine.

Referring to FIG. 3, the vertical tube T is part of the bearings of the shaft of the rotor of the turbine driving the alternator (not shown) which is located above the turbine.

Numerous modifications of the manner of making an draft tube described and shown in the drawing can be envisioned.

Instead of providing two guide plates 7 opposite the two guide plates 8, there could be just the plates 8 for guiding the stream of water.

The guide plates 8 instead of being assembled by welding their longitudinal edge to the inner face of a gutter 4,5 and by welding their other edge to the divider plate 6, could be assembled by securing both of their opposite longitudinal edges to the internal face of a gutter 4,5.

Instead of being constructed by assembling the two gutters 4,5 to a divider plate 6, the draft tube 3 could be constructed by assembling four gutters along their edges on two intermediate plates.

Also, as shown in FIG. 4 instead of placing gravel in the space between the guide plates 7,8 and the wall of the draft tube 3, it is conceivable that these plates could be provided with one or more holes 9, so as to transfer pressure exerted on them by the stream of water onto the wall of gutters 4,5.

We claim:

1. A draft tube for a reaction turbine, wherein the wall of the draft tube comprises gutters connected along their edges to at least one dividing plate forming a beam.

2. A draft tube according to claim 1 wherein, at least one flat plate is secured to the inner surface of the wall of the draft tube to guide the stream of water.

3. A draft tube according to claim 1 wherein, two gutters of semi-circular transverse cross-section are connected at their edges to said dividing plate which is of less width than the diameter of said gutters.

4. A draft tube according to claim 1 wherein, flat guide plates for guiding the stream of water are connected to said dividing plate and to the curved inner faces of said gutters and provide a space between said guide plates and said inner faces.

5. A draft tube according to claim 4 wherein said spaces are filled with a material which assures transfer of the pressure of the stream of water against the guide plates onto the walls of said gutters.

6. A draft tube according to claim 4 wherein, said guide plates are provided with at least one hole to assure transfer of the pressure of the stream of water against the guide plates onto the walls of said gutters.

* * * * *